United States Patent [19]

Nakamura

[11] Patent Number: 4,642,186

[45] Date of Patent: Feb. 10, 1987

[54] CLARIFYING APPARATUS

[75] Inventor: Yoshiaki Nakamura, Yokohama, Japan

[73] Assignee: Tokyo Shibaura Denki Kabushiki Kaisha, Kawasaki, Japan

[21] Appl. No.: 576,430

[22] Filed: Feb. 2, 1984

[51] Int. Cl.[4] .......................... C02F 9/00; G21F 9/04

[52] U.S. Cl. ................................ 210/257.1; 210/259; 210/295; 252/631; 252/627; 494/36

[58] Field of Search ....................... 252/631, 627, 626; 494/36, 37, 38, 85, 27, 64, 70; 210/295, 411, 512.1, 260, 259, 258, 682, 257.1

[56] References Cited

U.S. PATENT DOCUMENTS

| | | | |
|---|---|---|---|
| 1,032,641 | 7/1912 | Wright | 494/36 |
| 2,488,746 | 11/1949 | Strezynski | 494/36 |
| 2,854,143 | 9/1958 | Novak | 494/36 |
| 3,279,686 | 10/1966 | Hubmann | 494/36 |
| 3,300,051 | 1/1967 | Mitchell | 494/36 |
| 3,389,855 | 6/1968 | Müller | 494/36 |
| 4,052,303 | 10/1977 | Hultsch et al. | 494/36 |
| 4,274,962 | 6/1981 | Queiser et al. | 252/632 |

FOREIGN PATENT DOCUMENTS

| | | | |
|---|---|---|---|
| 2724954 | 12/1978 | Fed. Rep. of Germany | 252/631 |
| 2737759 | 3/1979 | Fed. Rep. of Germany | 494/36 |

*Primary Examiner*—Stephen J. Lechert, Jr.
*Assistant Examiner*—Howard J. Locker
*Attorney, Agent, or Firm*—Oblon, Fisher, Spivak, McClelland & Maier

[57] ABSTRACT

A nitric acid solution of spent fuel is primarily clarified by a centrifugal clarifier so as to separate insoluble fission particles each having a size of 1.04 μm or more from the solution. The primary clarified liquid is again clarified by a pulse filter device so as to remove small particles each having a size between 0.8 μm and 1.04 μm. The filter removes particles having a size smaller than a critical particle size of the centrifugal clarifier. Therefore, the centrifugal clarifier removes most of the fission product particles, and the filter device removes only the small fission particles. The replacement frequency of the filter is decreased, and the small particles are removed to obtain a high-quality clarified liquid.

6 Claims, 1 Drawing Figure

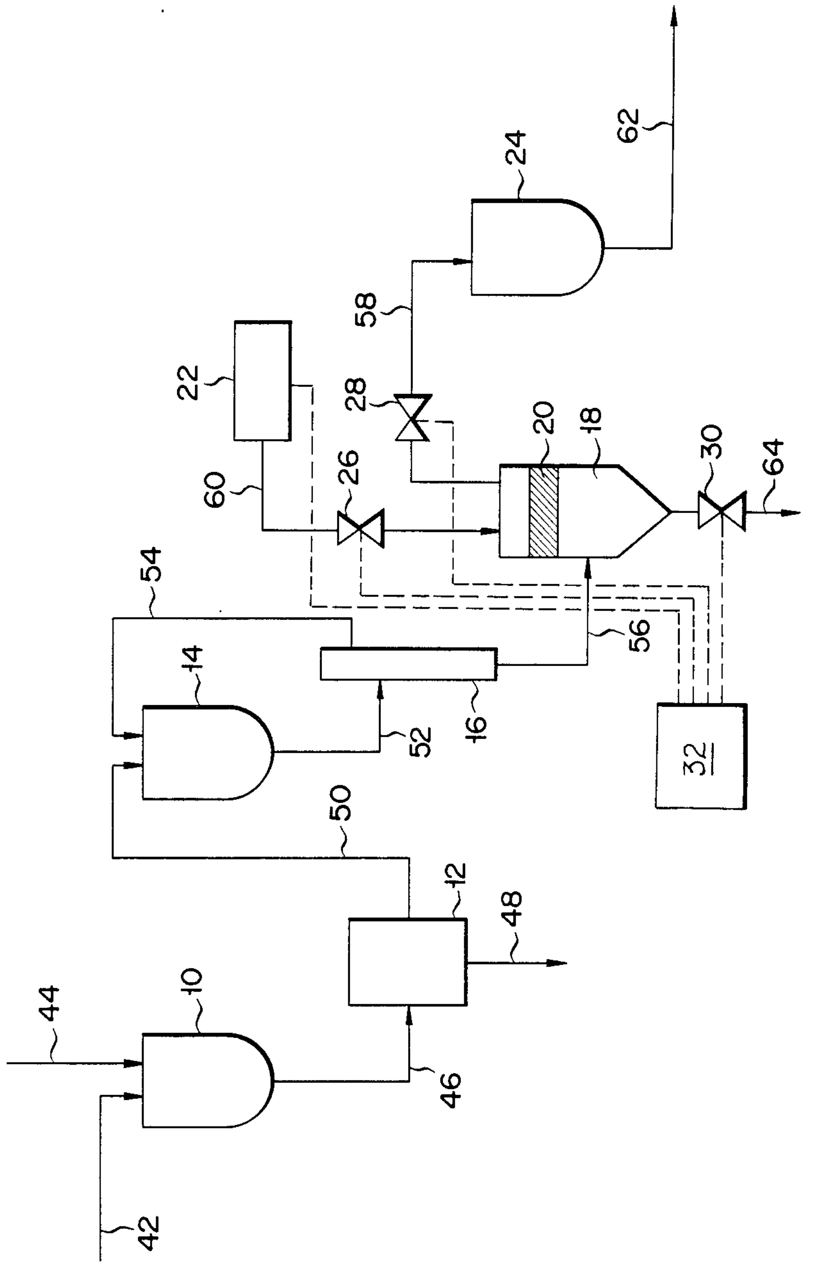
10
12
14
16
18
20
22
24
26
28
30
32
42
44
46
48
50
52
54
56
58
60
62
64

CLARIFYING APPARATUS

BACKGROUND OF THE INVENTION

The present invention relates to a clarifying apparatus for clarifying insoluble fission products or corrosion products in nuclear fuel reprocessing or clad processing of reactor cooling water.

An insoluble fission product is present in a spent fuel solution (nitric acid solution). The spent fuel solution is clarified to remove the insoluble fission product. The resultant clarified solution is subjected to the next extraction process.

A pulse filter apparatus is frequently used in the conventional clarifying process. In the pulse filter apparatus, the spent fuel solution is filtered through a filter obtained by sintering a stainless steel powder. The insoluble fission product is thus separated from the solution containing nuclear fuel. The sludge of the fission product deposited on the filter is removed from the filter by supplying pulsated air in a direction opposite to the direction of the fuel flow.

The pulse filter apparatus of this type is capable of removing relatively small particles of the insoluble fission product from the spent fuel solution and is capable of decreasing the size of particles left in the clarified solution below a predetermined value, thereby keeping the uniform quality of the solution. In addition, the pulse filter apparatus does not have a movable component, so that the apparatus is free from mechanical problems and has high reliability.

However, the pulse filter apparatus has a disadvantage in that the filter thereof tends to clog. When the sludge is deposited on the filter surface, the filtration rate is decreased. If this occurs, the filter must be replaced with a new one. The filter can be used for two or three months for clarification. However, at the time when the filter is replaced, the clarification process must be stopped for about a week, thus increasing clarification cost. In addition to this disadvantage, maintenance personnel tend to be exposed to radiation. The atmosphere is also subject to radioactive contamination. The filter, as a high level radioactive waste, limits waste disposal. For the above reasons, there arises a strong demand for eliminating replacement of the filter in the pulse filter apparatus.

Meanwhile, the centrifugal clarifier has recently received a great deal of attention. The spent fuel solution is supplied to a cylindrical rotating bowl and is separated by centrifugal separation in the centrifugal clarifier. More particularly, an insoluble fission product is separated from the solution by utilizing the difference between the specific gravities of the insoluble fission product and the nitric acid solution. In a centrifugal clarifier of this type, the flow rate per unit time can be increased. In addition to this advantage, the sludge deposited in the bowl can be easily removed by the remote control. However, in the centrifugal clarifier, it is difficult to decrease below a certain value a minimum size (to be referred to as a critical particle size dp) of insoluble fission product particles which can be processed. The critical particle size dp is given by equation (1) below:

$$dp=(18\cdot\mu\cdot Q/\Delta\rho\cdot g\cdot\Sigma)^{\frac{1}{2}} \quad (1)$$

where $\mu$: the viscosity of spent fuel solution

Q: the flow rate of spent fuel solution $\Delta\rho$: the difference between the specific gravities of the particles and the nitric acid solution g: the acceleration of gravity $\Sigma$: the centrifugal separation/deposition area which is given as follows:

$$\Sigma=\pi\cdot l\cdot\omega^2\cdot(r_2^2-r_1^2)/g\cdot[\ln(r_2/r_1)] \quad (2)$$

where l: the length of the bowl along its rotating axis $\omega$:the rotational velocity of the bowl $r_1$: the rotational radius between the rotational axis of the bowl and a position at which the solution is extracted $r_2$: the rotational radius between the rotational axis of the bowl and the inner surface thereof.

As is apparent from equations (1) and (2), in order to decrease the critical particle size dp, the radius $r_2$ or the rotational velocity $\omega$ must be increased. When the radius $r_2$ or the rotational velocity $\omega$ is increased, the peripheral speed of the bowl is increased, so that the bowl is subjected to a large centrifugal force. For this reason, the mechanical strength of the bowl must be sufficiently increased, and the wall thickness of the bowl must be increased. However, when the wall thickness is increased, the weight of the bowl is increased. As a result, a high-power bowl drive device is required, and a bearing which withstands a high stress must be used. In addition, the critical particle size dp can be decreased when the length l of the bowl is increased. However, the weight of the bowl is increased. For these reasons, it is impractical to design the centrifugal clarifier to decrease the critical particle size dp. In addition to this disadvantage, the sludge is deposited in the bowl and is gradually increased. As a result, the effective length l of the bowl is gradually decreased, and the critical particle size dp is increased. In this manner, the sludge must be removed from the centrifugal clarifier at a proper time. If the sludge is removed at the late time, the insoluble fission product cannot be removed in the centrifugal clarification process and will flow into the next process. In this manner, neither the conventional pulse filter apparatus nor the conventional centrifugal clarifier will solve the practical problems.

SUMMARY OF THE INVENTION

It is an object of the present invention to provide a clarifying apparatus which minimizes the frequency of filter replacement, improves safety and decreases the clarifying process cost.

It is another object of the present invention to provide a compact and light-weight clarifying apparatus capable of removing small fission product particles and providing a high-quality clarified solution.

According to the present invention, there is provided a clarifying apparatus having a centrifugal clarifier for centrifugally separating insoluble radioactive particles from a solution, and a filter means having a filter for removing particles having a size of not more than a critical particle size of the radioactive particles which can be separated by said centrifugal clarifier. The solution containing the insoluble particles is supplied by a first supplying means to the centrifugal clarifier. A primary clarified liquid is supplied by a second supplying means from the centrifugal clarifier to the filter means. The filter means filters the primary clarified liquid, thus obtaining a secondary clarified liquid.

According to the present invention, most of the insoluble radioactive particles (i.e., fission product or corrosion product) are removed by the centrifugal clarifier. The filter means need only filter smaller insoluble particles. Therefore, the rate of the sludge deposited in the filter of the filter means is low, thereby decreasing the frequency of replacement of the filter which is required upon filter clogging. A decrease in replacement frequency of the filter guarantees safe operation during the clarifying process, thus providing practical advantages. The filter replacement frequency is decreased, so that the utilization efficiency of the clarifying apparatus is improved, thereby decreasing the clarifying cost. The particle size range of the filter can be narrowed, so that the pore size of the filter can be comparatively small. As a result, even smaller particles can be effectively eliminated, and a high-quality clarified liquid is obtained. The smaller particles are removed by the filter means. In this sense, even if the centrifugal clarifier having a larger critical particle size is used, the small particles can also be removed from the liquid. In other words, the filter means serves as a backup means of the centrifugal clarifier, so that the safety and high reliability of the clarifying process are assured. For example, even if particles having a size larger than the critical particle size flow through the centrifugal clarifier due to the fact that the waste removal timing is lagged, these particles can be removed by the filter means and will not flow in the next process. Therefore, the reliability and waste removal timing requirements are not so strict as in the case where only a centrifugal clarifier is used, thereby improving the reliability of the apparatus and allowing easy operation thereof.

Furthermore, should the centrifugal clarifier break down, the pulse filter serves as a backup member. As a result, the particles will not flow into the next process.

BRIEF DESCRIPTION OF THE DRAWING

The FIGURE is a block diagram of a clarifying apparatus according to an embodiment of the present invention.

DETAILED DESCRIPTION OF THE PREFERRED EMBODIMENT

The clarifying apparatus has a centrifugal clarifier 12 and a pulse filter device 18 connected in tandem therewith at its downstream side. The spent fuel is dissolved in nitric acid in the dissolving process. The resultant nitric acid solution containing the spent fuel is subjected to various types of treatments and is supplied to a first buffer tank 10 through a line 42. The insoluble fission product is contained as particles in the spent fuel solution. An aqueous solution of nitric acid is supplied from a reservoir (not shown) to the buffer tank 10 through a line 44. The nitric acid solution containing the spent fuel is mixed with the aqueous solution of nitric acid in the buffer tank 10. The mixture is supplied to the centrifugal clarifier 12 through a line 46. The centrifugal clarifier 12 has the same construction as the conventional centrifugal clarifier.

In the centrifugal clarifier 12, the following conditions are given: the bowl of the centrifugal clarifier 12 has the radius $r_1$ of 7 cm, the radius $r_2$ of 10 cm and the length l of 20 cm; a rotational frequency N of the bowl is 2,500 rpm, and the flow rate Q is 500 l/hr; the viscosity $\mu$ of the liquid to be clarified is 0.015 poise, the specific gravity $\rho_p$ of the sludge is 7 g/cm$^3$, and the specific gravity $\rho_l$ of the aqueous solution of nitric acid is 1.4 g/cm$^3$. The rotational velocity $\omega$ of the bowl then becomes 261.7 rad/sec, and the difference $\Delta\rho$ between the specific gravities becomes 5.6 g/cm$^3$. Therefore, according to equations (1) and (2), the critical particle size dp becomes 1.04 $\mu$m. The insoluble fission product particles each having a size of not less than 1.04 $\mu$m are separated by the centrifugal clarifier 12 from the nitric acid solution. Cleaning water is supplied to the centrifugal clarifier 12 to wash the bowl by means of a high-pressure gas through a line (not shown). The used cleaning water is discharged through a drain 48 disposed in the centrifugal clarifier 12.

A primary clarified liquid is obtained such that the large particles are removed by the centrifugal clarifier 12 and is supplied to a second buffer tank 14 through a line 50. The primary clarified liquid is then supplied to a feed tank 16 through a line 52. The primary clarified liquid is supplied at a predetermined flow rate from the feed tank 16 to the pulse filter device 18 through a line 56. An overflow portion of the primary clarified liquid returns to the second buffer tank 14 through a line 54. The pulse filter device 18 has a filter 20 having a pore size of, for example, 0.8 $\mu$m so as to remove small particles each having a particle size smaller than the critical particle size dp. The primary clarified liquid is filtered through the filter 20, so that the insoluble fission product particles having a size falling within the range of 1 to 0.8 $\mu$m are removed. A secondary clarified liquid obtained from the pulse filter device 18 returns to a third buffer tank 24 through a line 58. A valve 28 is inserted in the line 58. A compressed air source 22 is connected to the clarified liquid outlet side of the filter 20 of the pulse filter device 18 through a line 60 so as to supply compressed air to the clarified liquid outlet side in a pulsated manner. A valve 26 is inserted in the line 60. A drain 64 is connected through a valve 30 to the clarified liquid inlet side of the filter 20 of the pulse filter device 18. The secondary clarified liquid is supplied from the third bufrer tank 24 to the next step through a line 62. A control means 32 controls the opening and closing of the valves 26, 28, and 30 and the actuation of the compressed air source 22.

The operation of the clarifying apparatus having the construction described above will now be described. The nitric acid solution containing spent fuel is mixed with the aqueous solution of nitric acid in the first buffer tank 10, and the mixture is supplied to the centrifugal clarifier 12. The centrifugal clarifier 12 is constructed to have a critical particle size dp of, for example, 1.04 $\mu$m. The centrifugal clarifier 12 removes comparatively large insoluble fission product particles.

The primary clarified liquid which has been subjected by the centrifugal clarifier 12 to primary clarification is supplied to the feed tank 16 through the second buffer tank 14. The primary clarified liquid is supplied at a predetermined flow rate from the feed tank 16 to the pulse filter device 18. The primary clarified liquid is subjected to further clarification by means of the filter 20. The small particles each having a size between 0.8 $\mu$m and 1.04 $\mu$m are removed by the filter 20. The secondary clarified liquid is supplied from the pulse filter device 18 to the next process through the buffer tank 24.

When the clarification operation is performed by the pulse filter device 18, the valves 26 and 30 are closed and the valve 28 is opened by the control means 32. On the other hand, when the sludge is deposited in the filter 20 of the pulse filter device 18, the valve 28 is closed, the valves 26 and 30 are opened and the compressed air source 22 is actuated by the control means 32. The pressurized air is supplied from the compressed air source 22 to the clarified liquid outlet side of the filter 20 in a pulsated manner. The sludge deposited on the clarified liquid inlet side of the filter 20 is blown out and is discharged through the drain 64.

The insoluble fission product contained in the nitric acid solution of spent fuel is mostly removed by the centrifugal clarifier 12. Only small particles are removed by the pulse filter device 18. Since the small particles need not be removed by the centrifugal clarifier 12, the bowl, the bowl drive device and the bearing need not be designed to withstand a high load. A normal-performance centrifugal clarifier can be used. Only a small amount of fission product need be removed by the pulse filter device 18, so that the deposition rate of sludge in the filter 20 is low. For this reason, even if compressed air is blown in a pulsated manner, the sludge can be easily removed, thereby guaranteeing the long service life of the filter 20.

The pulse filter device 18 can serve as a backup device for the centrifugal clarifier 12. Even if the fission product removal timing is lagged and the particles each having a size exceeding the critical particle size dp flow out of the centrifugal clarifier 12, they are removed by the pulse filter device 18 and will not flow into the next process.

The above embodiment is concerned with nuclear fuel reprocessing. However, the present invention can be applied to clad processing of reactor cooling water. Namely, the clarifying apparatus of the invention can clarify corrosion products produced in the clad processing.

I claim:

1. A clarifying apparatus for removing insoluble radioactive particles from a solution containing the particles, said clarifying apparatus comprising:

(a) a centrifugal clarifier for centrifugally separating the radioactive particles from the solution;

(b) filter means having a filter with a secondary clarified liquid outlet side for removing particles each having a size of not more than a critical particle size of the radioactive particles which can be separated by said centrifugal clarifier;

(c) supplying means for supplying the solution to said centrifugal clarifier;

(d) a buffer tank which receives the primary clarified liquid from said centrifugal clarifier;

(e) a feed tank for receiving the primary clarified liquid from said buffer tank and feeding the primary clarified liquid to said filter means at a predetermined flow rate;

(f) means for feeding an overflow portion of the primary clarified liquid from said feed tank back to said buffer tank;

(g) a compressed air supplying means for supplying compressed air to the secondary clarifying liquid outlet side of said filter in a pulsated manner; and (h) control means for supplying the compressed air to said filter in the pulsated manner when the primary clarified liquid is not being supplied to said filter means, thereby removing sludge from said filter.

2. A clarifying apparatus for removing particles from a solution containing the particles, said clarifying apparatus comprising:

(a) a centrifugal clarifier for centrifugally separating particles larger than a given size from the solution;

(b) first means for supplying the solution to said centrifugal clarifier;

(c) a first buffer tank;

(d) second means for supplying the solution from said centrifugal clarifier to said first buffer tank;

(e) a pulse filter device containing a filter capable of removing particles smaller than said given size from the solution, said filter having a first side and a second side;

(f) third means for supplying the solution from said first buffer tank to the first side of said filter in said pulse filter device at a flow rate independent of the flow rate of the solution into said first buffer tank;

(g) fourth means for supplying pulsating compressed air to the second side of said filter to backclean said filter;

(h) fifth means for supplying the solution from said pulse filter device to a successive process;

(i) sixth means for draining particles from said pulse filter device, said sixth means being in fluid communication with the first side of said filter; and (j) seventh means for controlling said fourth, fifth, and sixth means such that:

(i) said fifth means is closed when said fourth means is turned on and said sixth means is opened and (ii) said fifth means is opened when said fourth means is turned off and said sixth means is closed.

3. A clarifying apparatus as recited in claim 2 and further comprising a second buffer tank in said first means.

4. A clarifying apparatus as recited in claim 2 and further comprising a third buffer tank in said fifth means.

5. A clarifying apparatus as recited in claim 2 wherein said third means comprise:

(a) a feed tank in fluid communication with said pulse filter device and (b) eighth means for feeding overflow from said feed tank back to said first buffer tank.

6. A clarifying apparatus as recited in claim 2 wherein said seventh means controls a first valve located in said fourth means, a second valve located in said fifth means, and a third valve located in said sixth means.

* * * * *